United States Patent
Hejna, Jr.

(10) Patent No.: US 6,266,674 B1
(45) Date of Patent: Jul. 24, 2001

(54) RANDOM ACCESS INFORMATION RETRIEVAL UTILIZING USER-DEFINED LABELS

(76) Inventor: Donald J. Hejna, Jr., 395 Ano Nuevo Ave., Sunnyvale, CA (US) 94086

( * ) Notice: Subject to any disclaimer, the term of this patent is extended or adjusted under 35 U.S.C. 154(b) by 0 days.

(21) Appl. No.: 07/851,903

(22) Filed: Mar. 16, 1992

(51) Int. Cl.$^7$ .................................................. G06F 17/30
(52) U.S. Cl. ............................ 707/104; 707/3; 707/516; 379/67.1
(58) Field of Search ........................... 395/600, 160–164, 395/148; 358/403; 364/419.17, 419.19; 707/104, 3, 516; 379/67.1

(56) References Cited

U.S. PATENT DOCUMENTS

| | | | |
|---|---|---|---|
| 4,914,586 | * | 4/1990 | Swinehart ............................ 395/600 |
| 5,179,658 | * | 1/1993 | Izawa .................................. 395/164 |
| 5,231,670 | * | 7/1993 | Goldhor ................................ 381/43 |

OTHER PUBLICATIONS

Maxemchuk, "An Experimental Speech Storage and Editing Facility", Oct. 1980, pp 1383–1395, Bell System Technical Journal.*

* cited by examiner

Primary Examiner—Jean R. Homere
(74) Attorney, Agent, or Firm—Michael B. Einschlag

(57) ABSTRACT

Method and apparatus for storing information wherein a user defines labels which relate to the stored information and the user defines a data structure, for example, a hierarchical structure, comprised of such labels and method and apparatus for retrieving the stored information wherein the user randomly accesses the information utilizing the labels and the structure. In one embodiment of the present invention, a keypad is provided with pads to select movement up, down, to the right, and to the left in a hierarchical structure. Further, the keypad is provided with keys to cause insertion, deletion or interchange of labels; replay of labels and replay of stored information. Still further, in the preferred embodiment, up, down, left, and right directional arrows are provided to show a user which directions of movement are permitted at a particular point in the hierarchical structure.

52 Claims, 5 Drawing Sheets

| TIME_STAMP |
| --- |
| TOP_LABEL_ADDR |
| BOTTOM_LABEL_ADDR |
| LEFT_LABEL_ADDR |
| RIGHT_LABEL_ADDR |
| LABEL_START_ADDR |
| LABEL_END_ADDR |
| DATA_START_ADDR |
| DATA_END_ADDR |

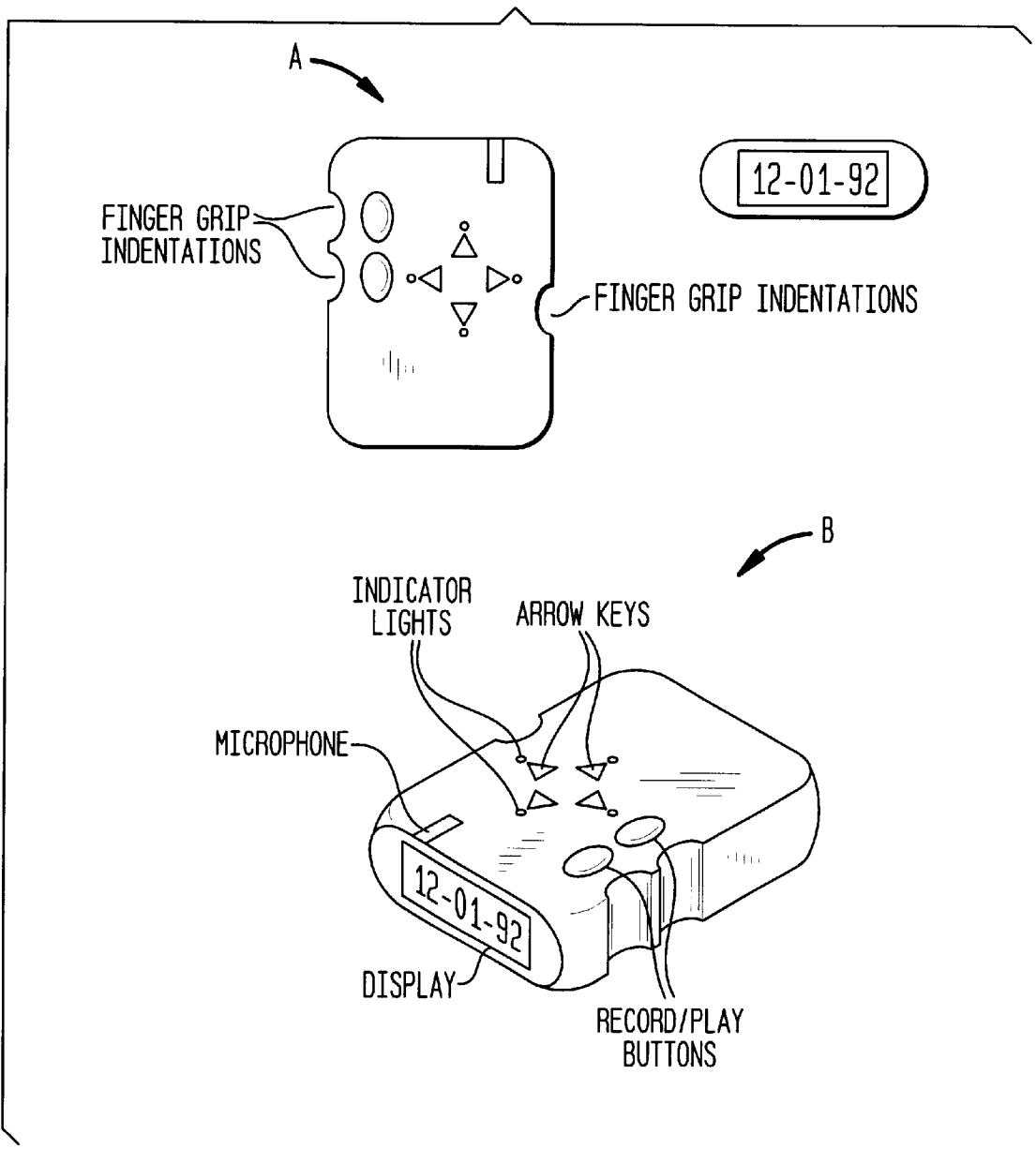

RANDOM ACCESS INFORMATION RETRIEVAL UTILIZING USER-DEFINED LABELS

TECHNICAL FIELD OF THE INVENTION

The present invention relates to method and apparatus for storing information wherein a user defines labels which relate to the stored information and the user defines a data structure, for example, a hierarchical structure, comprised of such labels and to method and apparatus for retrieving the stored information wherein the user randomly accesses the information utilizing the labels and the data structure. In particular, the information may be input in the form of audio input such as speech, music, and the like; facsimile (FAX); text; combinations thereof; and so forth.

BACKGROUND OF THE INVENTION

Several techniques exist in the art for storing and retrieving information such as, for example, speech information. One technique frequently employed is a written list. This technique has a drawback in that locating, sorting, and restructuring the information in the written list can prove to be prohibitively cumbersome when long lists are used. A cassette tape recorder is another example of a technique which exists in the art for storing and retrieving information in the form of speech information. This technique has a drawback in that storing and/or retrieving information is limited to sequential access to the information. While fast-forward and fast-rewind functions available with some tape recorders enable one to access a predetermined portion of a tape in a reasonably short amount of time, in general, one is required to perform several forward-play or reverse-play operations to locate a specific segment of the tape. In addition, retrieval of information from the tape typically requires one to have knowledge of at least a portion of the information—stored as a speech passage—or knowledge of the location of the information.

In light of the above, there is a need in the art for method and apparatus for storing and retrieving information which enable a user to access the information randomly in a manner which can be customized by the user who enters the information.

SUMMARY OF THE INVENTION

Embodiments of the present invention advantageously satisfy the above-identified need in the art and provide method and apparatus for storing and retrieving information which enables a user to access the information randomly in a manner which can be customized by the user who enters the information. In accordance with the present information, a user defines labels which relate to the stored information and the user defines a data structure, for example, a hierarchical structure, comprised of such labels. As will be described in detail below, the user-defined labels and the user-defined data structure advantageously combine to provide quick and easy random access to stored information.

In a preferred embodiment of the present invention which is used in connection with the storage of audio information such as speech information, music and the like, whenever a user speaks into a microphone, the user defines a portion of the speech to serve as a label by a label-defining process such as, for example, pressing a pad on a keypad device. Although the label-defining process may take place at any time, including after the speech is stored, the label-defining process preferably occurs when the user enters the speech.

Further, although the user may define a label to comprise any portion of an input speech segment, it is advantageous for the user to define labels which identify key elements of the speech.

In addition, in accordance with the present invention, the user may define a data structure, such as a hierarchical structure, for the labels. Further, in one embodiment of the present invention, the user may delete and/or reorder labels to refine the data structure.

In order to enter a new label into the data structure or to replay stored information, embodiments of the present invention provide means for searching through the data structure to select portions thereof at which to: (a) insert a new label along with the information it represents; (b) replay information a label represents; (c) delete a label; or (d) reorder labels. In a preferred embodiment of the present invention, a keypad is provided with pads to select movement up, down, to the right, and to the left in the hierarchical structure. Further, the keypad is provided with keys to cause insertion, deletion or interchange of labels; replay of labels and replay of stored information. Further, in the preferred embodiment, up, down, left, and right directional arrows are provided to show a user which directions of movement are permitted at a particular point in the hierarchical structure.

Although the above-described embodiments of the present invention relate to information which is input in the form of audio information such as speech, music and the like, the present invention is not limited to such embodiments. As such, the present invention contemplates embodiments wherein the information may be input in the form of speech, facsimile information ("FAX"), text information, and mixed forms of information such as speech and FAX, FAX and text, and so forth. Further, embodiments of the present invention may be fabricated wherein the form of information may be transformed from one form or group of forms to another so that the data may be input in one form and output in another form.

BRIEF DESCRIPTION OF THE DRAWING

A complete understanding of the present invention may be gained by considering the following detailed description in conjunction with the accompanying drawing, in which:

FIG. 7 shows an embodiment of the present invention in a hand-held, portable package.

Corresponding elements in each of the drawings have the same reference numbers.

DETAILED DESCRIPTION

Figure 1:
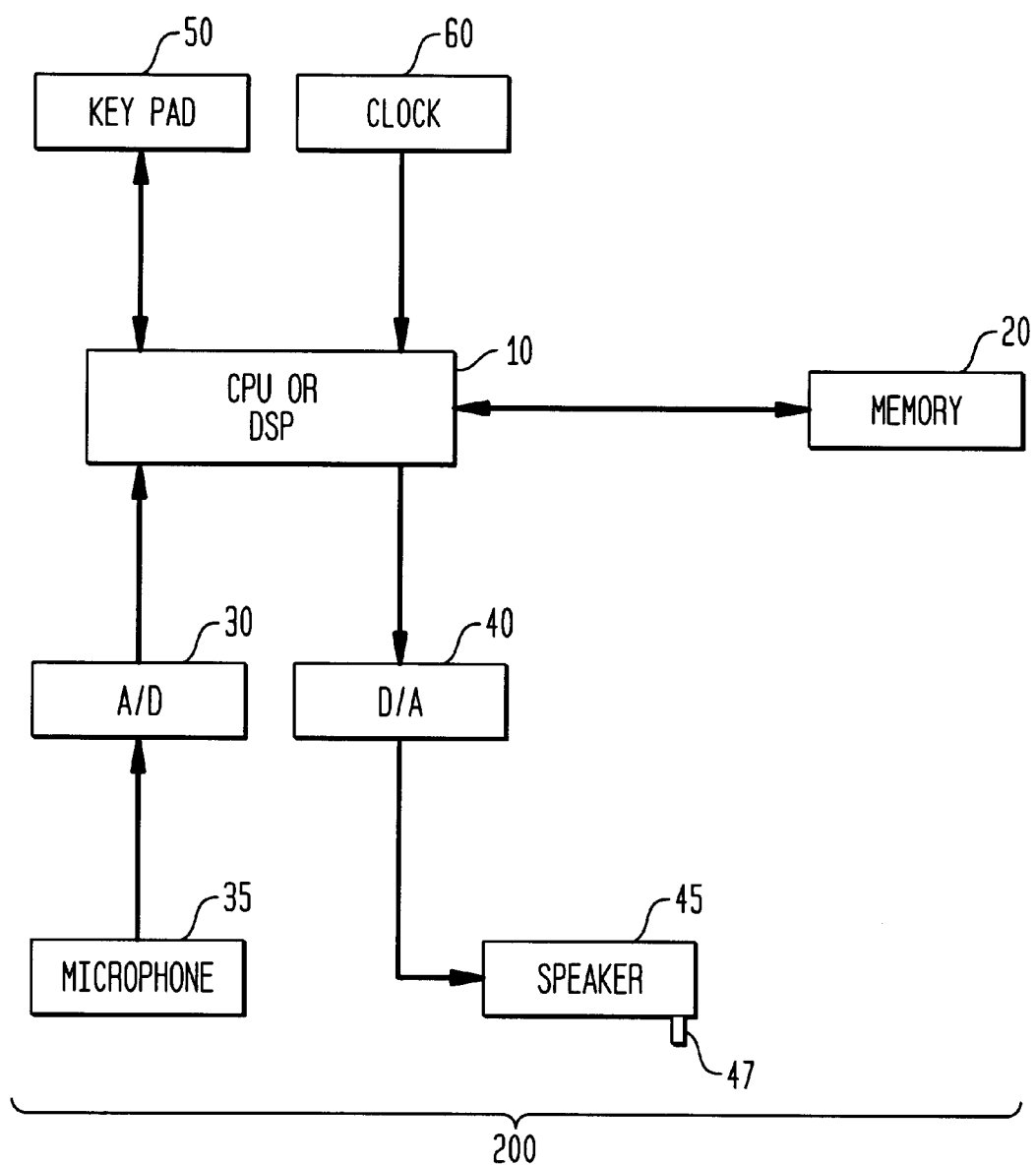
FIG. 1 shows a block diagram of a preferred embodiment of the present invention.

FIG. 1 shows a block diagram of a preferred embodiment of the present invention, apparatus 200. As shown in FIG. 1, apparatus 200 comprises central processing unit (CPU) or digital signal processor (DSP) 10. CPU 10 interfaces with memory 20, analog-to-digital (A/D) converter 30, digital-to-analog (D/A) converter 40, keypad 50, and clock 60. Further, as shown in FIG. 1, A/D converter 30 interfaces with microphone 35 and D/A converter 40 interfaces with speaker 45, which speaker 45 interfaces with volume-control 47. Among other things, memory 20 stores software which is used by CPU 10 to coordinate the activities of apparatus 200 shown in FIG. 1.

Apparatus 200 receives analog audio information such as speech, music, and the like from a user which is applied as input to microphone 35. Microphone 35 is apparatus which is well known to those of ordinary skill in the art for converting the analog audio information input from the user into an analog electrical signal, which analog electrical signal output from microphone 35 is applied as input to A/D converter 30. A/D converter 30 is apparatus which is well known to those of ordinary skill in the art for converting the analog electrical signal output by microphone 35 into a digital electrical signal, which digital electrical signal is applied as input to CPU 10.

Keypad 50 is apparatus which is well known to those of ordinary skill in the art for generating a signal which is activated whenever a user presses a pad on keypad 50, which signal identifies the pressing of a pad as well as the identity of the pressed pad. Further, the signals generated by keypad 50 are applied as input to CPU 10. Those of ordinary skill in the art understand that the present invention is not limited to this method of identifying keypad presses or the identity thereof and that the present invention encompasses all other methods of providing such information, i.e., the press of a key and the identity of the pressed key, to CPU 10.

As will be described in further detail below, CPU 10 utilizes inputs received from keypad 50, from A/D converter 30, and program instruction from memory 20 to store a digital representation of the audio information input from the user in a data base which is stored in memory 20 and to help the user define labels and a data structure, for example, a hierarchical structure, for the labels which is also stored in a coordinate data base in memory 20. Those of ordinary skill in the art understand that memory 20 may comprise memory of a specific type, for example, solid state RAM, for storing programs and may comprise solid state RAM or magnetic storage such as disc storage for storing audio input and/or labels and data structure information. Those of ordinary skill in the art further understand that the representations of the audio information such as speech which are stored in memory 20 may be stored in a different digital representation from that provided by A/D converter 30. For example, the output from A/D converter 30 may be compressed by CPU 10 before storage in memory 20. Such compression may be advantageous in some embodiments to minimize memory requirements.

As will be described in detail below, certain pad(s) on keypad 50 are used to indicate that the user wishes to input data, to define a label and/or a data structure such as a hierarchical structure and/or to sort labels; certain pad(s) on keypad 50 are used to indicate that the user wishes to delete data or to delete a label and/or, for example, a hierarchical structure; and certain pad(s) on keypad 50 are used to indicate that the user wishes to retrieve information from the data base in accordance with the data structure, such as a hierarchical structure, of labels. Those of ordinary skill in the art recognize that particular functions may be invoked by providing specific function keys such as for example, a specific key to indicate that input is to be received, a specific key to indicate that labels are to be retrieved by going through the hierarchical structure in a first direction or a second direction. In addition, further embodiments of the present invention may be fabricated wherein specific functions may require a combination of keys to be pressed for functions wherein no one specific keypad has been reserved. It should be understood that the present invention encompasses both of these approaches as well as a combination of these approaches. The manner in which apparatus 200 responds to the user's pressing of the pads on keypad 50 to effectuate specific functions will be explained in detail below.

Whenever apparatus 200 determines that at least a portion of user-specified, stored audio information such as speech information is to be transmitted to a user, CPU 10 retrieves the specified speech information from the data base in memory 20 under the control of programs which are stored in memory 20. The retrieved information is applied as input to CPU 10, which decodes, for example, by decompressing, the information to provide digital representations of the form normally output from A/D converter 30, if required, and applies the digital representations of the retrieved speech as input to D/A converter 40. D/A converter 40 is apparatus which is well known to those of ordinary skill in the art for converting a digital representation of an audio signal to an analog form. The analog output from D/A converter 40 is then applied as input to speaker 45 for broadcast to the user. The level of the output from speaker 45 may be adjusted by the user utilizing volume-control 47. It should also be understood that embodiments of the present invention include the use of methods of time-scale modification by CPU 10 to generate digital representations of the retrieved speech which are applied as input to D/A converter 40. Such methods and the methods of embodying them utilizing CPU 10 are well known in the art and are useful in speeding up or slowing down playback of information to speed up the retrieval process or to enhance the intelligibility of the retrieved information.

As will be explained in further detail below, CPU 10 executes software which is stored in memory 20 to, among other things, generate addresses for use in storing and retrieving information from the data base which is stored in memory 20; to convert digital output from A/D converter 30 into information, for example, compressed information, which is stored in memory 20; for converting information stored in memory 20 into an appropriate form for application to D/A converter 40 for producing audio signals which are provided using speaker 45; and for identifying functions requested by users through keypad 50. Memory 20 provides the following capabilities: (a) random access reads; (b) random access writes; and (c) an appropriate amount of storage for use in storing: (i) a data base comprised of information, labels, and a data structure, such as a hierarchical structure, of labels and (ii) software which is executed by CPU 10.

Before describing the details of operation of apparatus 200, we will briefly describe user-defined labels and user-defined hierarchical structures to better enable one to understand the detailed description of the present invention.

In accordance with the present invention, a user may define a label and a hierarchical structure of such labels which have the following properties for an embodiment wherein the information is speech information:

1. A label is an identifier which refers to speech information. For example, the speech information may comprise a few sentences and the label may comprise one or two words from the sentences which, for optimum utilization, enables a user to identify the information. For example, speech information may comprise a shopping list for a birthday and the label may comprise the words "shopping list."

2. In a hierarchical structure of labels, a label may be associated with any number labels which are lower in the hierarchy and which are related to the label, such an associated label which is lower in the hierarchy than the label is referred to as a sub-label or a "child" label since such a label may be pictured as a descendant of the label. In this connection, the original label will be referred to as a "parent" label.

3. In a hierarchical structure of labels, a label may be associated with any number of labels which are on the same level in the hierarchy and which are related to the label, such an associated label which is on the same level in the hierarchy is referred to as a "peer" label. Further, each "peer" label can have associated "child" labels.

Figure 2:
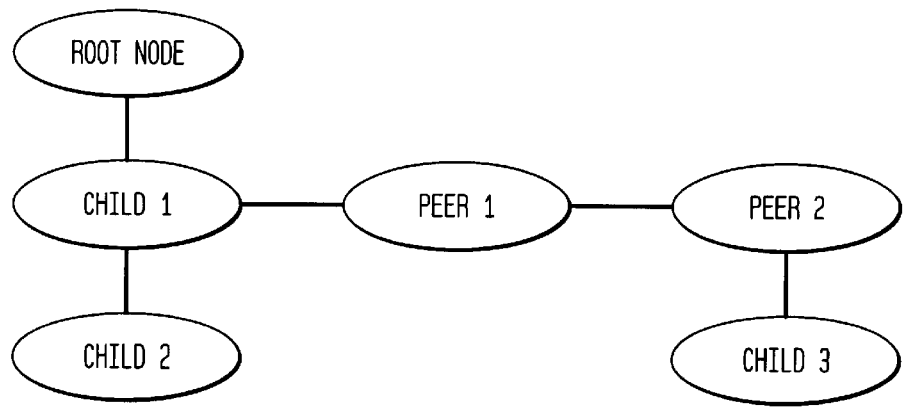
FIG. 2 shows a pictorial representation of a generalized hierarchical structure provided by an embodiment of the present invention.

Given the above, in general, a user may define a generalized hierarchical structure having the form shown in FIG. 2.

Figure 3:
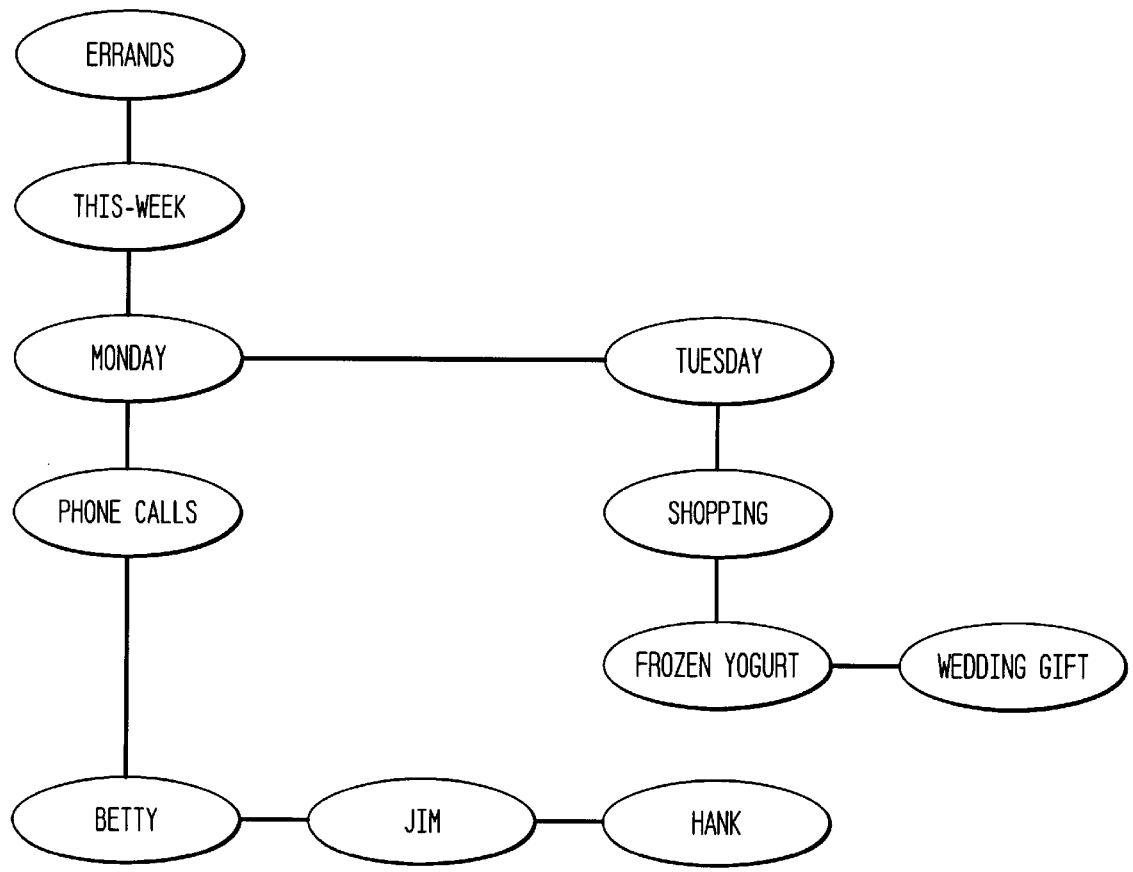
FIG. 3 shows a pictorial representation of an example of a hierarchical structure provided by the preferred embodiment of the present invention.

The generalized hierarchical structure shown in FIG. 2 may be understood better in the context of the following example with reference to FIG. 3. Assume that a user has entered the following speech as input into apparatus 200: "Pick up frozen yogurt for the party on Saturday evening." Then, further assume that the user has defined the phrase "frozen yogurt" to be a label for that speech. In accordance with the present invention and, as will be described below, the user may sort the labels he/she has previously defined to add the latest label, i.e., "frozen yogurt," to a previously defined hierarchical structure to produce the hierarchical structure shown in FIG. 3 for use as a reminder list of errands.

Figure 4:
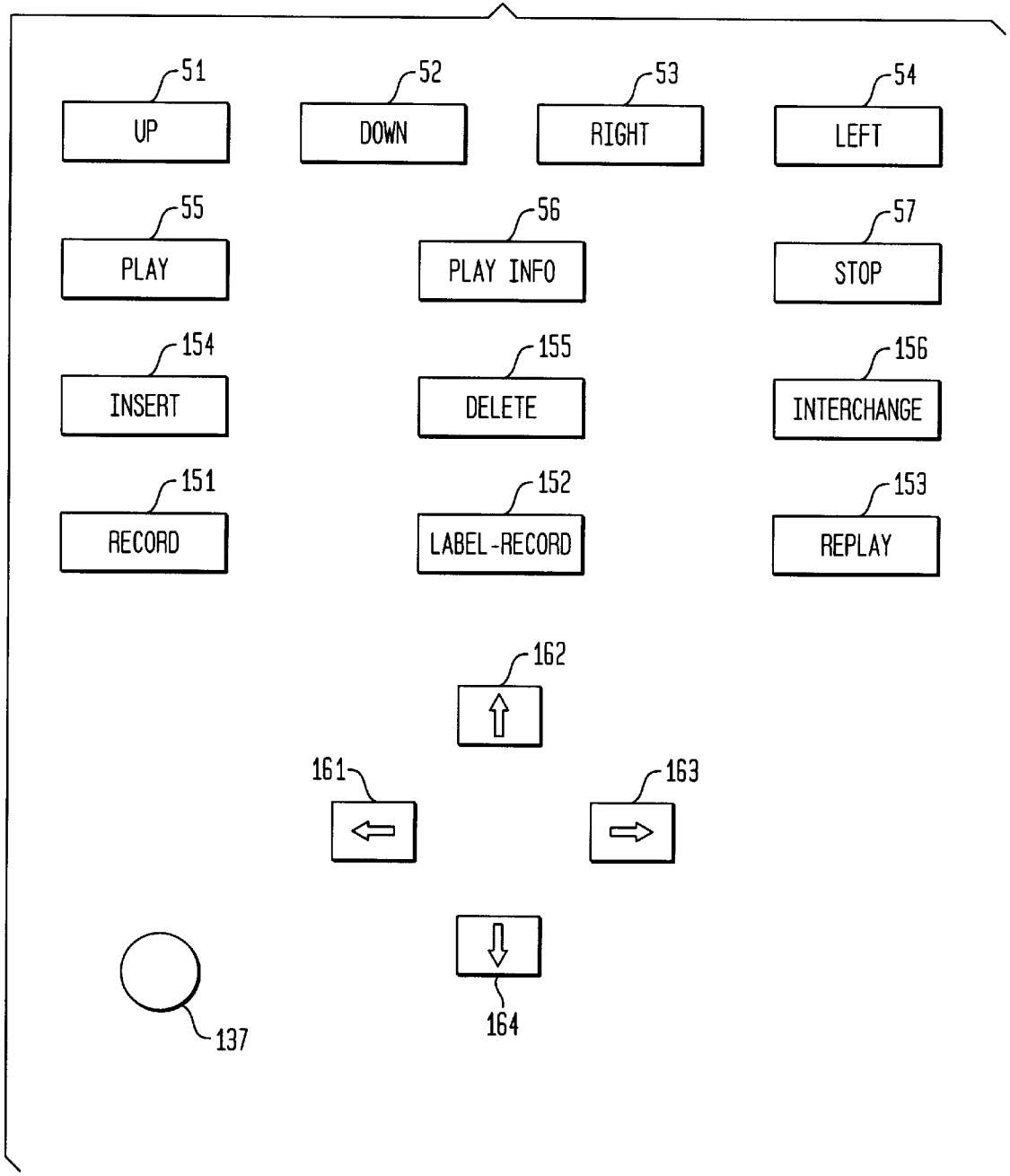
FIG. 4 shows an embodiment of a keypad which forms a portion of the preferred embodiment shown in FIG. 1.

FIG. 4 shows an example of one embodiment of keypad 50. As shown in FIG. 4, keypad 50 is comprised of the following pads: record-pad 151; up-pad 51 for moving up the hierarchy from "child" label to "parent" label; down-pad 52 for moving down the hierarchy from "parent" label to "child" label; right-pad 53 for moving to the right amongst "peer" labels; left-pad 54 for moving to the left amongst "peer" labels; play-pad 55 for playing back labels; play-info-pad 56 for playing back information; and stop-pad 57 for halting replay.

For ease of understanding, we will describe the method of operation of apparatus 200 in a user view before we describe in detail the method of operation of apparatus 200 in terms of the architecture of apparatus 200.

Storing Information—User View

A hierarchy is defined by a user and the user may construct the hierarchy to be as complex as the user is comfortable using. For instance the simplest hierarchy is a linear list comprising either all "peer" labels or all "child" labels. Increasing complexity is obtained by utilizing the two dimensional nature of links to create a hierarchy like that shown in FIG. 2. Since "peer" labels may refer to "child" labels, there is an almost infinite number of hierarchies that can be generated.

In order to add information to the data base and to add a corresponding label to the hierarchy, a user may operate in any of five modes. In a first mode, the user enters information and creates a label. In general, the label may be comprised of a portion of the information or it may be different from the information. Then, the user searches for a desired location in the hierarchy and causes the label to be inserted at that desired location. In a second mode, the user searches for a desired location in the hierarchy and then enters the information and creates a label, which label is inserted into the hierarchy at the desired location. Again, the label may be comprised of a portion of the information or it may be different from the information. In a third mode, the user creates a label. Then, the user searches for a desired location in the hierarchy and causes the label to be inserted at the desired location. Later, the user may input information to be associated with the label. In a fourth mode, the user searches for a desired location in the hierarchy and creates a label, which label is inserted into the hierarchy at the desired location. In a fifth mode, the user searches for a desired label in the hierarchy and inserts information into the data base which is associated with the label.

Consider the following example of operation in the first mode. In this first mode, a user first inputs information. To do this in the preferred embodiment, the user presses record-pad 151 on keypad 50 and starts speaking into microphone 35—in the preferred embodiment of the present invention, the user presses record-pad 151 for the duration of time that the user is inputting speech. When the user releases record-pad 151, speech is no longer stored in the data base. The user creates a label for the speech by pressing label-record-pad 152 while the user is inputting the portion of the speech which corresponds to the label—in a preferred embodiment of the present invention, the user presses label-record-pad 152 button for the duration of time that input speech corresponds to a label. In one embodiment, if the user does not indicate a label for input speech, the entire input speech will be used as a label. This is advantageous because it simplifies use by allowing users to input speech without worrying about labels at the time of recording. In one alternative of this mode of operation, the user may record a label for speech input by pressing replay-pad 153 to replay the just-entered speech and by pressing label-record-pad 152 whenever a portion of the replayed speech corresponds to a desired label—in a preferred embodiment of the present invention, the user presses label-record-pad 152 button for the duration of time that the replayed speech corresponds to a label. The user may create a label which is different from the information by pressing label-record-pad 152 alone and speaking into microphone 35—in the preferred embodiment of the present invention, the user presses label-record-pad 152 for the duration of time that the user is speaking. Next, the user enters a search mode to access the hierarchy and to determine a position at which the latest label is to be inserted. Then, the label is inserted at that position in the hierarchy by entering an insert mode. In the preferred embodiment, insertion is done in accordance with two simple rules: (a) "peer" labels are inserted to the right of a "highlighted" label and (b) "child" labels are inserted below a "highlighted" label—"highlighted" label is a label whose identity is signaled by an indicator light such as indicator light 137 on keypad 50 and/or by the emission of a special beep tone which is played over speaker 45.

The following describes the tools which are provided to search for a desired location in a hierarchy. For purposes of the following discussion we define a positional marker we will call a "cursor." The cursor specifies a current location in the hierarchy. In an embodiment with only audio playback for feedback the cursor position is defined as the last label played. In other embodiments, a graphical marker or a screen grid may be used to indicate the cursor position in the hierarchy. The hierarchy is traversed as follows. The user presses up-pad 51 to move the cursor up the hierarchy in a string of "child" labels—if the user reaches the top of the hierarchy, i.e., the root node, a special tone is played over speaker 45 to indicate this fact and, if the user reaches the top of the string of "child" labels, a special tone is played over speaker 45 to indicate this fact; the user presses down-pad 52 to move the cursor down the hierarchy in a string of "child" labels—if the user reaches the bottom of the string of "child" labels, a special tone is played over speaker 45 to indicate this fact; the user presses right-pad 53 to move the cursor to the right along a string of "peer" labels—if the user reaches the end of the string of "peer" labels, a special tone is played over speaker 45 to indicate this fact; and the user presses left-pad 54 to move the cursor to the left along a string of "peer" labels—if the user reaches the end of the string of "peer" labels, a special tone is played over speaker 45 to indicate this fact. As the cursor reaches a label in the hierarchy, the label will be played over speaker 45. If the user wishes to insert a new label to the right of the cursor, i.e., a "highlighted" label, as a "peer" label, then the user presses insert-pad 154 and right-pad 53, however, if the user wishes to insert the new label beneath the cursor, i.e., the "highlighted" label, as a "child" label, then the user presses insert-pad 154 and down-pad 52. Then, in the first mode wherein a new label has been entered, that new label will be inserted into the hierarchy.

Consider the following example of operation in the second mode. In this second mode, the user enters a search mode to access the hierarchy and to determine a position at which a label is to be inserted, all of which was described above. Next, the user inputs information and creates a label in the manner described above with respect to the first mode of operation. Lastly, the new label is inserted into the hierarchy by pressing the appropriate combination of insert-pad 154 and down-pad 52; insert-pad 154 and right-pad 53; or insert-pad 154 and left-pad 54, as described above. When the new label is entered into the hierarchy, the user receives confirmation of the event by an indication from indicator light 137.

Consider the following example of operation in the third mode. In this third mode, a user first creates a label in the manner described above. Next, the user enters a search mode to access the hierarchy and to determine a position at which the latest label is to be inserted, all of which was described above. Lastly, the label is inserted at that position in the hierarchy by entering an insert mode in the manner which was described above. When the new label is entered into the hierarchy, the user receives confirmation of the event by an indication from indicator light 137.

Consider the following example of operation in the fourth mode. In this fourth mode, the user enters a search mode to access the hierarchy and to determine a position at which a label is to be inserted, all of which was described above. Next, the user creates a label in the manner described above. Lastly, the new label is inserted into the hierarchy by pressing the appropriate combination of insert-pad 154 and down-pad 52; insert-pad 154 and right-pad 53; or insert-pad 154 and left-pad 54, as described above. When the new label is entered into the hierarchy, the user receives confirmation of the event by an indication from indicator light 137.

Consider the following example of operation in the fifth mode. In this fifth mode, the user enters a search mode to access the hierarchy and to determine the position of a desired label in the manner described above. Next, the user inputs information and associates it with the label by pressing record-pad 151 and insert-pad 154 and by speaking into microphone 35. If information is already associated with the label, it will be replaced by the newly inputted information.

Retrieving Information—User View

A user can retrieve information from the data base as follows. The user enters a search mode as described above. For example, the user may wish to move the cursor to the root node. The user may then move the cursor to different nodes in the hierarchy by pressing the appropriate sequences of up-pad 51, down-pad-52, right-pad 53 and left-pad 54. For example, if the user places the cursor at the root node, the user may only move in one direction, i.e., down a "child" string. In this case, whenever the user selects down-pad 52, the cursor will move to the "child" label below the root node and the label associated with that node in the hierarchy will be played back to the user over speaker 45. Referring to FIG. 2, at this point the cursor can be moved in two possible directions: (a) down to "child2" or (b) right to "peer1." In accordance with the preferred embodiment, whenever the cursor moves to a node in the hierarchy, the label associated with that node is played back to the user. While in search mode, direction arrows 161–164 are lighted to indicate allowed directions of movement at each node in the hierarchy.

In order to simplify the process of returning to the root node of the hierarchy, or to quickly move to a higher level in the hierarchy, the user may indicate movement in the upward direction by pressing up-pad 51. If no node exists above the present location of the cursor, a special tone will be generated and if up-pad 51 is still pressed, the cursor will jump left in the hierarchy to the first node which contains a node above it. After the cursor has moved up one level the label associated with that node is played back to the user and the indicator lights are updated to reflect possible directions for movement.

When the cursor has arrived at a selected label, the user initiates replay of the input speech represented by the selected label by pressing play-pad 55. If no information is associated with a particular label, several optional activities occur: (a) a special tone is generated; (b) a special code is indicated by indicator light 137; or (c) no output is provided. Further, in a preferred embodiment, the user may replay an entire "child" string by pressing play-pad 55 and down-pad 52 at the same time. In this instance, apparatus 200 will first play each label and then replay information which is associated with the label. The user may interrupt any replay by pressing stop-pad 57 or by pressing an arrow key which indicates that the cursor should move in the specified direction.

Deleting Information—User View

In the preferred embodiment of the present invention, a user can delete a label and any associated information from the data base. In order to do this, the user enters the search mode and moves the cursor to a selected label. Then, the user presses delete-pad 155. This will cause the deletion of the selected label and any associated information and all members of the hierarchy which hang therefrom. All "peer" labels are moved to the left into the place of the deleted "peer" label. Before deletion, a warning will be played if the label indicated for deletion has any child labels. In addition, in the preferred embodiment, all labels which would be deleted by deleting the specified label are replayed and a prompt is provided—by special sound signal or by special indicator light signal—for confirmation.

Sorting Information—User View

In the preferred embodiment of the present invention, the user can reorder the hierarchy in a number of predetermined ways. For example, two "peer" labels in a "peer" label string may be interchanged, i.e., their positions in the "peer" label string may be switched. In such a reordering, all "child" labels which depend or hang from a particular "peer" label remain with the original "peer" label. Further, two "child" labels in a "child" label string may be interchanged, i.e., their positions in the "child" label string may be switched. In such a reordering, all "peer" label strings which grow out of a "child" label are not interchanged.

In order to perform the interchange, the user enters the search mode and moves the cursor to a first selected label. Then, the user presses interchange-pad 156. Next, the user again enters the search mode and moves the cursor to a second selected label by pressing the appropriate arrow key. Finally, the user presses interchange-pad 156 again to cause the interchange to occur. If the interchange is not permitted by the hierarchy such as, for example, by attempting to interchange "peer" labels from different levels of the hierarchy, apparatus 200 will generate a special signal from speaker 45.

Software Architecture of the Preferred Embodiment

Figures 5, 6:
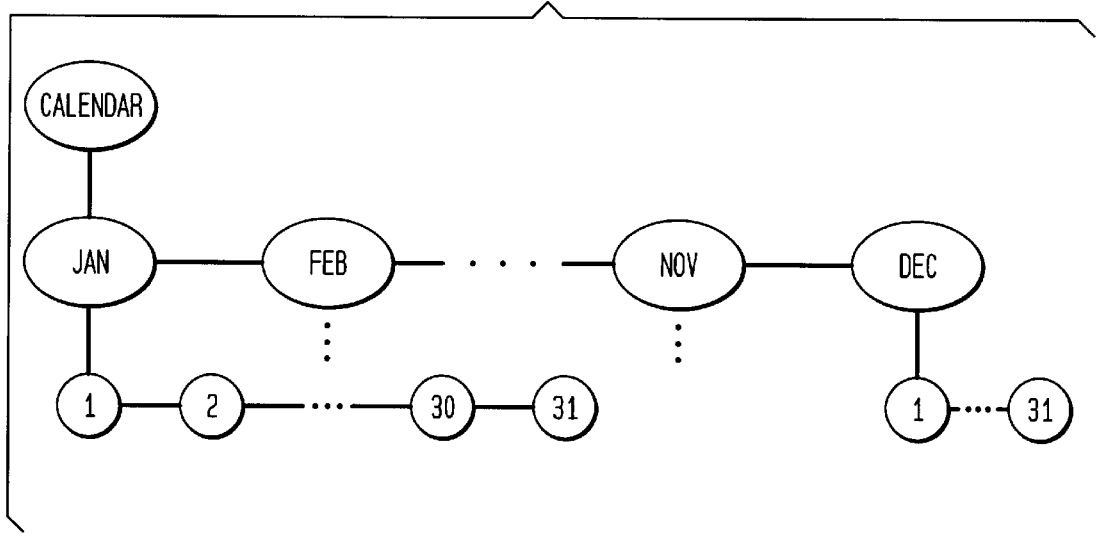
FIG. 5 shows a pictorial representation of a data-module which stores information and label addresses, which data-module is organized in accordance with the preferred embodiment of the present invention.
FIG. 6 shows a pictorial representation of a default hierarchy comprised of a calendar.

With the above in mind, we now turn to describe the manner in which apparatus 200 shown in FIG. 1 provides storage of information, user-defined labels which are associated with the stored information, and a user-defined hierarchical structure of user-defined labels as described above. In accordance with the preferred embodiment of the present invention, information and the label which relates thereto, are stored in memory 20. Further, their addresses are stored in memory 20 as a single entity which is referred to as a data-module. FIG. 5 shows a pictorial representation of a data-module which is fabricated in accordance with the preferred embodiment of the present invention. The entities shown in FIG. 5 are defined as follows:

| | |
|---|---|
| TIME_STAMP = | time stamp indicates the time the data-module was created |
| TOP_LABEL_ADDR = | memory address of the top neighbor data-module |
| BOTTOM_LABEL_ADDR = | memory address of the bottom neighbor data-module |
| LEFT_LABEL_ADDR = | memory address of the left neighbor data-module |
| RIGHT_LABEL_ADDR = | memory address of the right neighbor data-module |
| LABEL_START_ADDR = | memory address of the start of the label |
| LABEL_END_ADDR = | memory address of the end of the label |
| DATA_START_ADDR = | memory address of the start of the data |
| DATA_END_ADDR = | memory address of the end of the data |

In a preferred embodiment of the present invention, memory 20 is fabricated using a 4 Megabyte Single In-line Memory Module ("SIMM"). The SIMM is comprised of a multiplicity of 8 by 4 by 1 bit Dynamic Random Access Memories ("DRAMs") arranged in parallel and is used in conjunction with a DRAM controller of a type which is well known in the art to provide refresh operations and to provide read and write operations to specific addresses. As is well known to those of ordinary skill in the art, a DRAM memory module is typically accessed by first strobing a page address to the DRAM memory module and then strobing an offset in the page to specify a particular location in the memory module, i.e., addresses in DRAM memory comprise a page number and an offset on the page. The combination of these two numbers specify a unique address in memory 20. For the preferred embodiment, memory 20 is comprised of 1024 pages of memory and each page comprises 4096 bytes.

In the preferred embodiment of the present invention, address space in memory 20 is divided into two areas: (a) a data segment which is used to store speech information and (b) a module segment which is used to store data modules that comprise a hierarchical structure of labels.

In accordance with the preferred embodiment of the present invention, storage locations in each area, i.e., the data segment and the module segment, are grouped together in fixed size increments, each of which increments are treated as a unit—a unit in the data segment is a memory page and a unit in the module segment is a module.

In the preferred embodiment of the present invention, all units in the module segment reside on page 0 of memory, i.e., the page address is 0x00000. This is advantageous in that only an offset address needs to be specified to specify the location of a unit in the module segment, i.e., a data module. Further, each unit in the data segment is specified solely by its page number, thus no offset need be specified for DATA_START_ADDR and DATA_END_ADDR. Lastly, each segment comprises two address registers that reside, preferably, at the start of each segment. The two address registers point to a list of available memory, i.e., a segment "free-list." The first address register of each segment contains the address of the first empty module in the case of the module segment and the first empty page in the case of the data segment. The second address register of each segment contains the address of the last empty module in the case of the module segment and the last empty page in the case of the data segment. These registers in their respective segments form "free-list" start and end pointers for the module segment and "free-list" start and end pointers for the data segment. Thus, to obtain a unit of memory from the "free list" of either segment, the address contained in the "free-list" start pointer is copied and used to specify the address of the next memory unit available for use. Next the "free-list" start pointer is loaded with the address of the next available memory unit which is contained as the first entry in the memory unit about to be used. Storing the pointer to the next available memory unit in the first location of the available units is advantageous because it simplifies retrieval and it provides extra time to generate subsequent addresses in the data pages. The use of a "free-list" is advantageous because data need never be packed on deletion or copied from one location to another, only pointers to the "free-list" need be updated.

In the preferred embodiment of the present invention, deletion of a unit in the module segment after information is deleted is performed as follows. The starting address of the unit in the module segment is loaded into the first entry of the last unit in the memory segment "free-list" (the last unit is identified by the module segment "free-list" end pointer register), and then copied into the module segment "free-list" end pointer register. This links the unit to the module segment "free-list" and updates the module segment "free-list" end pointer. Thus, deletion need update only two pointers and is accomplished with two writes.

Deletion of units in the data segment is similar to the deletion of units in the module segment with one exception—a block of several units in the data segment may be deleted at once. Deletion of units in the data segment proceeds as follows. The starting address of the unit or a linked list of units in the data segment (the starting address is identified by DATA_START_ADDR of the data module) is written to the first entry of the last free unit in the data segment "free-list" (this is identified in the data segment "free-list" end register). Next, the starting address of the last unit in the data segment for the data item to be deleted (the starting address is identified by DATA_END_ADDR of the data module) is loaded into the data segment "free-list" end register. This appends the linked list of units for the data item which is to be deleted to the data segment "free-list" and updates the data segment "free-list" end pointer. Note that the procedure is identical for deletion of a single unit or several units and requires the same number of operations. For a single unit, the DATA_START_ADDR and DATA_END_ADDR will both point to the start of the same unit.

In accordance with the preferred embodiment of the present invention, whenever a module and the data item to which it refers are to be deleted, the units in the data segment must be deleted before the unit in the module segment is deleted.

In order to invoke the functions provided by apparatus 200, as described above, a user may press predetermined pads on keypad 50 and may hold the pads in a pressed state for a period of time. In response to the pressing and/or releasing of pads, signals are applied as input to CPU 10, which signals identify the pads which are pressed and/or released to provide the functions requested by the user.

Storing Information—Apparatus View

If CPU 10, in conjunction with data and programs stored in memory 20, determines that the user wishes to provide speech input, the following steps occur. CPU 10, in conjunction with programs stored in memory 20, obtains the address of an empty module from the module segment "free-list" and obtains the address of a free page of memory from the data segment "free-list." Then, CPU 10 stores the address of the free page of memory in the acquired data module (the one to which the free list pointer points) in memory 20 at an offset address referred to as DATA_START_ADDR—see FIG. 5. As the user speaks into microphone 45, CPU 10 receives digital representations of the speech from A/D converter 30. CPU 10 transfers the data, in a compressed or uncompressed form, to memory 20 for storage at increasing addresses on the memory page whose address is stored in DATA_START_ADDR. In the preferred embodiment, as recording continues, data received from A/D converter 40 is written to subsequent pages from the data segment "free-list" of data base pages stored in memory 20. In the preferred embodiment, the first storage location on each page is reserved and is used to store the location of the next page so as to provide a linked list of memory pages for the input speech. In the preferred embodiment, whenever the user releases the record pad, a signal is input to CPU 10 and, in response, CPU 10 determines whether the last address at which data is stored on the latest memory page corresponds to an address on the second half of the page. If so, the remainder of the page is filled with silence and the page is removed from the data segment "free-list." However, if the address corresponds to an address on the first half of the page, the page is returned to the data segment "free-list" and the previous page address is stored in DATA_END_ADDR. This method is advantageous in that it obviates the need to clear data from half-used pages and insures that the data base will always contain valid data or silence. Lastly, the address of the last page of memory that contains data from the message is stored in the data module at an offset address referred to as DATA_END_ADDR—see FIG. 5.

The following describes the manner in which an embodiment of the present invention provides labels for a portion of the input speech. Labels may be formed in one of three ways: (a) in the first way, a label is comprised of a portion of input speech; (b) in the second way, a label is comprised of a portion of replayed speech; and (c) in the third way, a label is comprised of different information. In the first way of forming labels, the user defines a label while the user is recording speech. To do this, the user presses label-record-pad 152 on keypad 50 while recording—in the preferred embodiment of the present invention, the user presses label-record-pad 152 for the duration of time that the input speech corresponds to a label. In response to the pressing of label-record-pad 152, a signal is input to CPU 10. In response, CPU 10 determines the address in memory 20 which is currently being used to store data and CPU 10 stores this address in the data module at an offset address LABEL_START_ADDR. When label-record-pad 152 is released, a signal is input to CPU 10. In response, CPU 10 determines the address in memory 20 which is currently being used to store data and CPU 10 stores this address in the data module at an offset address LABEL_END_ADDR. In the second way of forming labels, the user defines a label while speech is replayed from storage. To do this, the user first presses replay-pad 153 and then presses and releases label-record-pad 152 to indicate which portion of the replayed speech is to be the label. CPU 10 responds to the pressing and releasing of label-record-pad 152 to store the addresses of the data in the same manner as was described above for the first way of forming labels. Lastly, in the third way of forming labels, the user records speech which is used solely as a label. To do this, the user presses label-record-pad 152 on keypad 50 while the user inputs speech. In response to the pressing of label-record-pad 152, a signal is input to CPU 10. In response, CPU 10, in conjunction with programs stored in memory 20, obtains the address of an empty module from the module segment "free-list" and obtains the address of a free page of memory from the data segment "free-list." Then, CPU 10 stores the address of the free page of memory in the acquired data module in memory 20 at an offset address referred to as LABEL_START_ADDR. As the user speaks into microphone 45, CPU 10 receives digital representations of the speech from A/D converter 30. CPU 10 transfers the data, in a compressed or uncompressed form, to memory 20 for storage at increasing addresses on the memory page whose address is stored in LABEL_START_ADDR. As recording continues, data received from A/D converter 40 is written to subsequent pages from the data segment "free-list" of data base pages stored in memory 20. In the preferred embodiment, whenever the user releases label-record pad 152, a signal is input to CPU 10 and, in response, CPU 10 determines whether the last address at which data is stored on the latest memory page corresponds to an address on the second half of the page. If so, the remainder of the page is filled with silence and the page is removed from the data segment "free-list." However, if the address corresponds to an address on the first half of the page, the page is returned to the data segment "free-list" and the previous page address is stored in LABEL_END_ADDR. Lastly, the address of the last page of memory that contains data from the message is stored in the data module at an offset address referred to as LABEL_END_ADDR.

In apparatus 200: (a) dedicated current_module register 171 (not shown) stores the address of the current data module in the hierarchy and (b) dedicated current_input_module register 172 (not shown) stores the address of the current data module which has not yet been inserted into the hierarchical structure. CPU 10 uses current_module register 171 to determine locations of neighboring modules in the hierarchy and uses current_input_module register 172 as a buffer to hold a data module which has either does not yet have a label or has not yet been inserted into a hierarchical structure. As was described above, if no label has been assigned to input, the default causes the entire input speech to be the label.

A root node resides at the top of the hierarchical structure of apparatus 200, the root node resides at a fixed location, for example, (0x00000010), and cannot be removed. Data modules are inserted below the root node to provide a user-defined hierarchical structure. The addition of a module to an existing hierarchical structure is done by searching the hierarchical structure for a desired point at which the new module is to be entered and then entering the module specified by the user as follows. As was described above, a cursor specifies a current location in the hierarchy. In an embodiment with only audio for feedback, the cursor position is defined as the last label played. In other embodiments, a graphical marker or a screen grid may be used to indicate the cursor position in the hierarchy. The hierarchy is traversed as follows. The user presses up-pad 51 to move the cursor up the hierarchy in a string of "child" labels. The pressing of the pad causes a signal to be sent to CPU 10. In response, CPU 10 retrieves TOP_LABEL_ADDR from the current module. If this points to the root node, indicating that the user has reached the top of the hierarchy, CPU 10 retrieves a digital representation of a signal and sends it to D/A 40 which causes a special tone to be played over speaker 45 to indicate this fact. Similarly, if TOP_LABEL_ADDR indicates that the user has reached the top of a string of "child" labels, CPU 10 causes a special tone to be played over speaker 45 to indicate this fact. Otherwise, current_module register 171 becomes the address indicated by TOP_LABEL_ADDR. In conjunction with this search mode of operation, CPU 10 examines TOP_LABEL_ADDR, BOTTOM_LABEL_ADDR, LEFT_LABEL_ADDR, and RIGHT_LABEL_ADDR to determine whether the user may move the cursor up, down, to the left, or to the right in the hierarchy. If any of the movements are proper for the particular hierarchy, CPU 10 generates signals to cause respective ones of direction arrows 161–164 to be lighted. Thus, for example, if the cursor is in the middle of a "child" label string where there are no "peer" labels, then only the up-arrow and down arrows are lighted. As those of ordinary skill in the art will readily appreciate, in a particular embodiment of the present invention, predetermined unique addresses are used to indicate that an address points to the root node, the top of a string of "child" labels, the end of a string of "peer" labels, and so forth.

The user presses down-pad 52 to move the cursor down the hierarchy in a string of "child" labels. The pressing of the pad causes a signal to be sent to CPU 10. In response, CPU 10 retrieves BOTTOM_LABEL_ADDR from the current data module. If this points to the end of the string of "child" labels, CPU 10 retrieves a digital representation of a signal and sends it to D/A converter 40 which causes a special tone to be played over speaker 45 to indicate this fact. Otherwise, current-module register 171 becomes the address indicated by BOTTOM_LABEL_ADDR.

The user presses right-pad 53 to move the cursor to the right along a string of "peer" labels. The pressing of the pad causes a signal to be sent to CPU 10. In response, CPU 10 retrieves RIGHT_LABEL_ADDR from the current data module. If this points to the end of the string of "peer" labels, CPU 10 retrieves a digital representation of a signal and sends it to D/A converter 40 which causes a special tone to be played over speaker 45 to indicate this fact. Otherwise, current_module register 171 becomes the address indicated by RIGHT_LABEL_ADDR.

The user presses left-pad 54 to move the cursor to the left along a string of "peer" labels. The pressing of the pad causes a signal to be sent to CPU 10. In response, CPU 10 retrieves LEFT_LABEL_ADDR from the current module. If this points to the end of the string of "peer" labels, CPU 10 retrieves a digital representation of a signal and sends it to D/A converter 40 which causes a special tone to be played over speaker 45 to indicate this fact. Otherwise, current_module register 171 becomes the address indicated by LEFT_LABEL_ADDR.

As the cursor reaches a label in the hierarchy, the label will be played over speaker 45. This is done as CPU 10 retrieves LABEL_START_ADDR and LABEL_END_ADDR from the current module. Then, CPU 10 retrieves the data, starting at LABEL_START_ADDR and transfers a digital representation of the speech, decompressed if necessary, to D/A converter 40 to cause the label to be played over speaker 45.

When the user wishes to insert a new label to the right of the cursor as a "peer" label, then the user presses insert-pad 154 and right-pad 53, however, if the user wishes to insert the new label beneath the cursor as a "child" label, then the user presses insert-pad 154 and down-pad 52. The pressing of the pads causes signals to be sent to CPU 10. In response, CPU 10 determines the desired place of insertion and inserts the current data module into the hierarchy by adjusting pointers TOP_LABEL_ADDR, BOTTOM_LABEL_ADDR, RIGHT_LABEL_ADDR, and LEFT_LABEL_ADDR in a manner which is well known to those of ordinary skill in the art to provide a doubly-linked list.

If the user is operating in the first, second, third, or fourth modes, a label will be inserted into the hierarchy when CPU 10 detects the pressing of insert-pad-154. Whenever a new label is entered into the hierarchy, the user receives confirmation because CPU 10 sends a signal which causes indicator light 137 to turn on for a brief period of time.

If the user is operating in the fifth mode, CPU 10 will update the LABEL_START_ADDR and LABEL_END_ADDR pointers for the selected label when it detects the pressing of record_pad 151 and insert_pad 154 and the subsequent release of either record_pad 151 or insert_pad 154. Initially, CPU 10 examines DATA_START_ADDR for the data module of the selected label. If this pointer indicates that information is already associated with the label, CPU 10 deletes that information in a manner to be described below before it goes about the task of resetting the appropriate pointers for the new input information.

Retrieving Information—Apparatus View

The user enters a search mode as described above. In order to simplify the process of returning to the root node of the hierarchy, or to quickly move to a higher level in the hierarchy, the user may indicate movement in the upward direction by pressing up-pad 51. If no node exists above the present location of the cursor, a special tone will be generated and if up-pad 51 is still pressed, CPU 10 will cause the cursor to jump left in the hierarchy to the first node which contains a node above it—as those of ordinary skill in the art understand, this is done by examining LEFT_LABEL_ADDR and TOP_LABEL_ADDR. After the cursor has moved up one level, the label associated with that node is played back to the user in the manner described above for replay of a label, and CPU 10 updates direction arrows 161–164 to indicate possible directions for movement.

When the cursor has arrived at a selected label, the user initiates replay of the input speech by pressing play-pad 55. The pressing of the pad causes a signal to be sent to CPU 10. In response, CPU 10 retrieves DATA_START_ADDR and DATA_END_ADDR from the current module. Then, CPU 10 retrieves the data, starting at DATA_START_ADDR and transfers a digital representation of the speech, decompressed if necessary, to D/A converter 40 to cause the data to be played over speaker 45. The replay continues until after the speech in DATA_END_ADDR is replayed. Further, in a preferred embodiment, the user may replay an entire "child" string by pressing play-pad 55 and down-pad 52 at the same time. In response, CPU 10 will cause apparatus 200 to play each label in the manner described above for replay of a label and then to replay the information to which the label refers in the manner described above for replay of information. The user may interrupt any replay by pressing stop-pad 57. In response, CPU 10 will cease any replay.

Deleting Information—Apparatus View

In the preferred embodiment of the present invention, a user can delete a label and the corresponding information from the data base. In order to do this, the user enters the search mode and moves the cursor to a selected label. Then, the user presses delete-pad 155. In response, CPU 10 will cause the deletion of the selected label and all members of the hierarchy which hang therefrom in a manner which is well known to those of ordinary skill in the art by deleting the appropriate members of the linked lists and returning the memory to the appropriate data segment or module segment "free-list." When a "peer" label is removed, all "peer" labels in the string are moved to the left to fill in the position of the deleted "peer" label. In the preferred embodiment of the present invention, prior to deleting information, the label which relates to that information is replayed in the manner described above and a special tone is provided and/or indicator light 137 is blinked. In response, a user is required to press delete-pad 155 to confirm the deletion. The confirmation is detected by CPU 10 in the manner described above for detecting and identifying a keypad press. The deletion is deferred if any other pad is pressed than delete-pad 155 or if no keypad press is detected within a predetermined amount of time, which timeout condition is taken with reference to a well known interaction between CPU 10 and clock 60.

Sorting Information—Apparatus View

In the preferred embodiment of the present invention, the user can reorder the hierarchy in a number of predetermined ways. For example, two "peer" labels in a "peer" label string may be interchanged, i.e., their positions in the "peer" label string may be switched. In such a reordering, all "child" labels which depend or hang from a particular "peer" label remain with the original "peer" label. This is accomplished by appropriately reordering the linked lists in a manner which is well known to those of ordinary skill in the art. Further, two "child" labels in a "child" label string may be interchanged, i.e., their positions in the "child" label string may be switched. In such a reordering, all "peer" label strings which grow out of a "child" label are not interchanged.

In particular, in order to perform an interchange, the user enters the search mode and moves the cursor to a first selected label. Then, the user presses interchange-pad 156. In response, CPU 10 stores the address of the current module. Next, the user again enters the search mode and moves the cursor to a second selected label. Finally, the user presses interchange-pad 156 again to cause the interchange to occur. In response, CPU 10 performs the interchange between the current module and the previously saved current module. If the interchange is not permitted by the hierarchy such as, for example, by attempting to interchange "peer" labels from different levels of the hierarchy, apparatus 200 will generate a special signal from speaker 45.

Built-in Hierarchy

To simplify the user interface, in the preferred embodiment, a default sub-hierarchy is provided with apparatus 200. This default sub-hierarchy comprises prerecorded, commonly used labels such as, for example, groceries, days of the week, hours of the day. Another example, shown in FIG. 6, comprises a calendar which contains string of "child" labels corresponding to months, each of which month entries comprise a string of "child" labels of days. This standard hierarchy could then be accessed using special input keys to specify moving the cursor to Wednesday of next week to add an appointment for example.

In the calendar hierarchy described above, in the preferred embodiment, the current module will automatically point to the current date in accordance with a periodic sampling of the output of internal clock 60.

In the preferred embodiment, one can access the default hierarchy by pressing a special pad or by pressing a predetermined sequence of pads. As this type of event is interpreted by CPU 10, CPU 10 inserts the address of the default hierarchy in current_module.

It should be understood that one can utilize an embodiment of the present invention for dictation. For example, during input, labels may be created which represent key ideas in sentences and/or paragraphs. After recording, labels and associated information may be reordered and/or deleted and/or new labels and information may be added. All this provides method and apparatus for editing the dictation input in order to construct a more cohesive letter or speech.

It should also be understood that the present invention encompasses embodiments wherein information and a data structure of labels may be formed off-line and then transmitted to the embodiment. For example, in one embodiment, the information and data structure may be stored on a memory module such as a disk. The information and data structure are then transferred to the embodiment by inserting the disk into a disk unit which serves as a portion of, for example, memory 20. In another embodiment, the information and data structure may be transmitted to the apparatus by any one of a number of data transfer mechanisms which are well known to those of ordinary skill in the art such as a data link. In such an embodiment, CPU 10 receive the transferred data and stores it in memory 20 to provide user access thereto as if the user had input the information and data structure. Such an embodiment is advantageous in that a user may exploit the random access properties of the embodiment to navigate the information and data structure which has been downloaded thereinto. One example of an advantageous use of such an embodiment is in a business which may wish to enter inventory data according to department or aisles. In this example, a hierarchy of labels is downloaded into an embodiment of the present invention. The labels, when replayed, disclose the layout of merchandise in the business. The embodiment is given to workers for their use in entering data in a "hands free" manner using speech. The worker would use the embodiment by following directions provided by replay of the labels in the hierarchy and the worker would record information which is associated with each label. Thus, if a label specified, for example, aisle 3, the worker would count boxes in aisle three and enter it as information related to that label.

Additionally a predetermined hierarchy structure can be used to convey a map or directions in which the labels represent options such as, for example, "you may go left to see the modern art" or "oil paintings are located to your right." In such an embodiment, information associated with the labels may give details relating to label selected. For instance, a museum could download information on exhibits and users could press appropriate arrow keys to navigate the hierarchy as they move through the museum, thereby providing a self-guided tour with audio information about the exhibits. As those of ordinary skill in the art will readily appreciate, the present invention extends to method and apparatus which can be used so that movement in a hierarchy parallels movement through a museum, library, or city and includes embodiments which provide directions. For example, using methods well known to those skilled in the art, one can download information and labels in digitally encoded form which provide a a hierarchy of right and left turns needed to go from one location in a city to another. The user would then navigate the hierarchy as he or she executed right or left turns while receiving information from the embodiment which confirmed location and provided future options. Furthermore, using techniques which are well known to those skilled in the art, one could download information from data transmitted as one changes location. For example, different locations in a theme park may have downloaders to update the hierarchy, or different cities may have broadcast stations which transmit information in a wireless fashion to units in vehicle to keep the hierarchy up to date with respect to changes in position. FIG. 7 shows one possible embodiment of the present invention in a hand-held portable package.

Those skilled in the art recognize that further embodiments of the present invention may be made without departing from its teachings. For example, although the above-described embodiments of the present invention relate to information which is entered in the form of speech, further embodiments of the invention may be fabricated using any other types of data such as, for example and without limitation, facsimile information ("FAX"), text information, and mixed forms of information such as speech and FAX, FAX and text, and so forth. In particular, embodiments of the present invention may be fabricated where, for example, information is entered as speech and labels are entered as text. Peripheral equipment for use in inputting and/or outputting information in these forms is well known to those of ordinary skill in the art and the manner in which CPU 10 would interface therewith are also well known in the art. Further, embodiments of the present invention may be fabricated wherein the form of the information may be transformed from one form or group of forms to another. Thus, data input as text may be transformed in a manner which is well known to those of ordinary skill in the art so that it may be output in FAX form. Still further embodiments of the present invention may comprise a screen for use as an interactive apparatus. For example, in an embodiment which comprises a screen such as that provided by an LCD display data may be display to a user in the form of icons.

Also, those skilled in the art will readily appreciate that the present invention further encompasses modes of operation wherein the stored information and/or labels may be manipulated in ways which are additional to those described above. For example, in one further embodiment of the present invention a user may replace existing information with new information or a user may replace an existing label with a new label. In light of the above, one of ordinary skill in the art will appreciate that such a function is fabricated by first performing a search to select either information or a label and then by inputting new information or a new label and indicating by a predetermined press of a pad or sequence of pads that the new information or new label is to replace the information or the label at the selected position.

Lastly, although the interface has required the user to push pads on a keypad, the present invention is not limited to such embodiments. For example, the present invention contemplates an interface wherein the user inputs commands by speech and the embodiment comprises speech recognition which can decode the spoken commands.

What is claimed is:

1. Method for storing information provided by a user which comprises:

in response to user input, receiving and storing information;

in response to user input, designating the information as data while the information is being received;

in response to user input, designating at least a portion of the information as a label while the information is being received;

in response to user input, traversing a data structure and providing an indication of a location in the data structure;

in response to user input, storing the label at the location in the data structure; and associating the label with the data.

2. The method of claim 1 wherein the information is audio information and the data structure is a hierarchical data structure.

3. Method for storing information provided by a user which comprises:

in response to user input, receiving and storing information;

in response to user input, designating the information as data while the information is being received;

in response to user input, conveying the stored information to the user and designating at least a portion of the stored information as a label while the stored information is being conveyed;

in response to user input, traversing a data structure and providing an indication of a location in the data structure;

in response to user input, storing the label at the location in the data structure; and associating the label with the data.

4. The method of claim 3 wherein the information is audio information and the data structure is a hierarchical data structure.

5. Method for storing information provided by a user which comprises:

in response to user input, receiving and storing first and second information;

in response to user input, designating the first information as data while the first information is being received;

in response to user input, designating the second information as a label while the second information is being received;

in response to user input, traversing a data structure and providing an indication of a location in the data structure;

in response to user input, storing the label at the location in the data structure; and associating the label with the data.

6. The method of claim 5 wherein the first and second information is audio information and the data structure is a hierarchical data structure.

7. Method for storing information provided by a user which comprises:

in response to user input, traversing a data structure and providing an indication of a location in the data structure;

in response to user input, receiving and storing information;

in response to user input, designating the information as data while the information is being received;

in response to user input, designating at least a portion of the information as a label while the information is being received;

in response to user input, storing the label at the location in the data structure; and associating the label with the data.

8. The method of claim 7 wherein the information is audio information and the data structure is a hierarchical data structure.

9. Method for storing information provided by a user which comprises:

in response to user input, traversing a data structure and providing an indication of a location in the data structure;

in response to user input, receiving and storing information;

in response to user input, designating the information as data while the information is being received;

in response to user input, conveying the stored information to the user and designating at least a portion of the stored information as a label while the stored information is being conveyed;

in response to user input, storing the label at the location in the data structure; and associating the label with the data.

10. The method of claim 9 wherein the information is audio information and the data structure is a hierarchical data structure.

11. Method for storing information provided by a user which comprises:

in response to user input, traversing a data structure and providing an indication of a location in the data structure;

in response to user input, receiving and storing first and second information;

in response to user input, designating the first information as data while the information is being received;

in response to user input, designating the second information as a label while the second information is being received;

in response to user input, storing the label at the location in the data structure; and associating the label with the data.

12. The method of claim 11 wherein the first and second information is audio information and the data structure is a hierarchical data structure.

13. Method for storing information provided by a user which comprises:

in response to user input, for receiving and storing information;

in response to user input, designating at least a portion of the information as a label while the information is being received;

in response to user input, traversing a data structure and providing an indication of a location in the data structure;

in response to user input, storing the label at the location in the data structure;

in response to user input, receiving and storing further information;

in response to user input, designating the further information as data while the data is being received;

in response to user input, traversing the data structure and providing an indication of the location in the data structure;

in response to user input, associating the label at the location with the data.

14. The method of claim 13 wherein the information is audio information and the data structure is a hierarchical data structure.

15. Method for storing information provided by a user which comprises:

in response to user input, traversing a data structure and providing an indication of a location in the data structure;

in response to user input, receiving and storing information;

in response to user input, designating at least a portion of the information as a label while the information is being received;

in response to user input, storing the label at the location in the data structure;

in response to user input, receiving and storing further information;

in response to user input, designating the further information as data while the data is being received;

in response to user input, traversing the data structure and providing an indication of the location in the data structure;

in response to user input, associating the label at the location with the data.

16. The method of claim 15 wherein the information is audio information and the data structure is a hierarchical data structure.

17. Apparatus for storing information provided by a user which comprises:

info input means, in response to user input, for receiving and storing information;

data means, in response to user input, for designating the information as data while the information is being received;

label means, in response to user input, for designating at least a portion of the information as a label while the information is being received;

search means, in response to user input, for traversing a data structure and for providing an indication of a location in the data structure;

means, in response to user input, for storing the label at the location in the data structure; and associating means, in response to user input, for associating the label with the data.

18. The apparatus of claim 17 which further comprises:

second label means, in response to user input, for conveying the stored information to the user and for designating at least a portion of the stored information as the label.

19. The apparatus of claim 18 which further comprises:

third label means, in response to user input:

(a) for causing the info input means to receive and store further information; and (b) for designating the further information as the label while the further information is being received.

20. The apparatus of claim 19 which further comprises:

retrieval means, in response to user input:

(a) for traversing the data structure and for providing an indication of a location in the data structure;

(b) for conveying a label at the location to the user;

(c) for conveying information associated with the label; and (d) for conveying all labels and their associated information from a preselected portion of the data structure.

21. The apparatus of claim 20 which further comprises:

deletion means, in response to user input:

(a) for traversing the data structure and for providing an indication of a location in the data structure;

(b) for deleting a label at the location from the data structure;

(c) for deleting information associated with the label; and (d) for deleting all labels and their associated information from a preselected portion of the data structure.

22. The apparatus of claim 21 which further comprises:

switching means, in response to user input:

(a) for traversing the data structure and for providing an indication of a first and an indication of a second location; and (b) for storing the label at the first location at the second location and for storing the label at the second location at the first location.

23. The apparatus of claim 18 wherein the information is audio information and the data structure is a hierarchical data structure.

24. The apparatus of claim 19 which further comprises:

second associating means, in response to user input:

(a) for causing the search means to traverse the data structure and for providing an indication of the location in the data structure of a stored label;

(b) for causing the info input means to receive and store further information;

(c) for causing the data means to designate the further information as data; and (d) for associating the data with the stored label.

25. The apparatus of claim 24 wherein the information and the further information is audio information and the data structure is a hierarchical data structure.

26. The apparatus of claim 19 wherein the information and the further information is audio information and the data structure is a hierarchical data structure.

27. The apparatus of claim 20 wherein the information and the further information is audio information and the data structure is a hierarchical data structure.

28. The apparatus of claim 21 wherein the information and the further information is audio information and the data structure is a hierarchical data structure.

29. The apparatus of claim 17 wherein the search means further comprises indicator means for providing an indication of the location.

30. The apparatus of claim 29 wherein the indicator means comprises means for conveying a label at the location.

31. The apparatus of claim 29 wherein the indicator means further comprises means for indicating another location in the data structure.

32. The apparatus of claim 31 wherein: (a) the information is audio information; (b) the data structure is a hierarchical data structure; and (c) the means for indicating another location comprises means for indicating whether the another location is above, below or on a same level in the hierarchical data structure.

33. The apparatus of claim 30 wherein the information comprises audio information and the data structure is a hierarchical data structure.

34. The apparatus of claim 17 wherein the information is audio information and the data structure is a hierarchical data structure.

35. Apparatus for storing information provided by a user which comprises:

search means, in response to user input, for traversing a data structure and for providing an indication of a location in the data structure;

info input means, in response to user input, for receiving and storing information from the user;

data means, in response to user input, for designating the information as data while the information is being received;

label means, in response to user input, for designating at least a portion of the information as a label while the information is being received;

means, in response to user input, for storing the label at the location in the data structure; and associating means, in response to user input, for associating the label with the data.

36. The apparatus of claim 35 which further comprises:

second label means, in response to user input, for conveying the stored information to the user and for designating at least a portion of the stored information as the label.

37. The apparatus of claim 36 which further comprises:

third label means, in response to user input:

(a) for causing the info input means to receive and store further information; and (b) for designating the further information as the label while the further information is being received.

38. The apparatus of claim 37 which further comprises:

retrieval means, in response to user input:

(a) for traversing the data structure and for providing an indication of a location in the data structure;

(b) for conveying a label at the location to the user;

(c) for conveying information associated with the label; and (d) for conveying all labels and their associated information from a preselected portion of the data structure.

39. The apparatus of claim 38 which further comprises:

deletion means, in response to user input:

(a) for traversing the data structure and for providing an indication of a location in the data structure;

(b) for deleting a label at the location from the data structure;

(c) for deleting information associated with the label; and (d) for deleting all labels and their associated information from a preselected portion of the data structure.

40. The apparatus of claim 39 which further comprises:

switching means, in response to user input:

(a) for traversing the data structure and for providing an indication of a first and an indication of a second location; and (b) for storing the label at the first location at the second location and for storing the label at the second location at the first location.

41. The apparatus of claim 36 wherein the information is audio information and the data structure is a hierarchical data structure.

42. The apparatus of claim 37 which further comprises:

(b) for causing the info input means to receive and store further information;

(c) for causing the data means to designate the further information as data; and (d) for associating the data with the stored label.

43. The apparatus of claim 42 wherein the information and the further information is audio information and the data structure is a hierarchical data structure.

44. The apparatus of claim 37 wherein the information and the further information is audio information and the data structure is a hierarchical data structure.

45. The apparatus of claim 38 wherein the information and the further information is audio information and the data structure is a hierarchical data structure.

46. The apparatus of claim 39 wherein the information and the further information is audio information and the data structure is a hierarchical data structure.

47. The apparatus of claim 35 wherein the search means further comprises indicator means for providing an indication of the location.

48. The apparatus of claim 47 wherein the indicator means comprises means for conveying a label at the location.

49. The apparatus of claim 48 wherein the information comprises audio information and the data structure is a hierarchical data structure.

50. The apparatus of claim 47 wherein the indicator means further comprises means for indicating another location in the data structure.

51. The apparatus of claim 50 wherein: (a) the information is audio information; (b) the data structure is a hierarchical data structure; and (c) the means for indicating another location comprises means for indicating whether the another location is above, below or on a same level in the hierarchical data structure.

52. The apparatus of claim 35 wherein the information is audio information and the data structure is a hierarchical data structure.

\* \* \* \* \*